United States Patent [19]

Schiepe et al.

[11] 4,193,725
[45] Mar. 18, 1980

[54] STACKING DEVICE FOR ROD-LIKE OR BOARD-SHAPED GOODS

[75] Inventors: Heinz Schiepe; Ulrich Pfeiffer, both of Berlin, Fed. Rep. of Germany

[73] Assignee: Firma Heinz Schiepe, Grosshandel und Generalvertretung für Holzbearbeitungsmaschinen, Berlin, Fed. Rep. of Germany

[21] Appl. No.: 927,508

[22] Filed: Jul. 24, 1978

[30] Foreign Application Priority Data

Aug. 3, 1977 [DE] Fed. Rep. of Germany ....... 2735469

[51] Int. Cl.² .............................................. B65G 57/02
[52] U.S. Cl. ...................................... 414/83; 198/799; 414/84; 414/85
[58] Field of Search ........................ 414/82, 83, 84, 85, 414/89, 91; 198/799

[56] References Cited

FOREIGN PATENT DOCUMENTS 1235808  3/1967  Fed. Rep. of Germany ............. 414/82
2553724  6/1977  Fed. Rep. of Germany ............. 414/82

Primary Examiner—L. J. Paperner
Assistant Examiner—George F. Abraham
Attorney, Agent, or Firm—Max Fogiel

[57] ABSTRACT

A stacking arrangement for rod-like or board-shaped products, in which stacking carts travel vertically on upright stands. There are provided horizontally traveling support arms and parallel-guided revolving engaging members which have fixed stops and which receive the goods at the rear side of the upright stands and deposit them on the storage area located on top of the upright stands. The storage area extends at least by the width of a stack row to be formed beyond the stretch traversed by the fixed stop on the top side of the upright stands. The stacking carts, with retracted support arms projecting over the upper edge of the stacking carts for lifting the stack row can be vertically moved underneath the storage area and can be lowered with the stacked row after extending the support arms in order to deposit the stacked row by retracting the support arms. The fixed stops are located at the rear end of the engaging members, each of which is connected with one link of two parallel chains by swivels which are rotatable in the engaging members.

7 Claims, 11 Drawing Figures

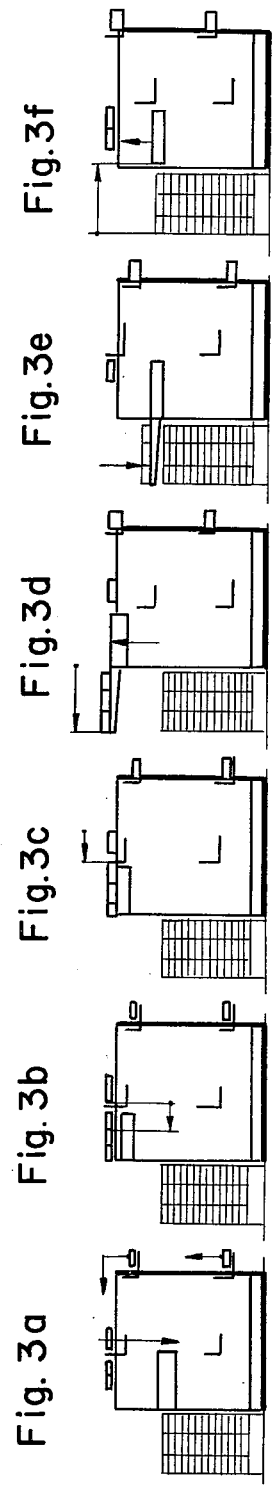

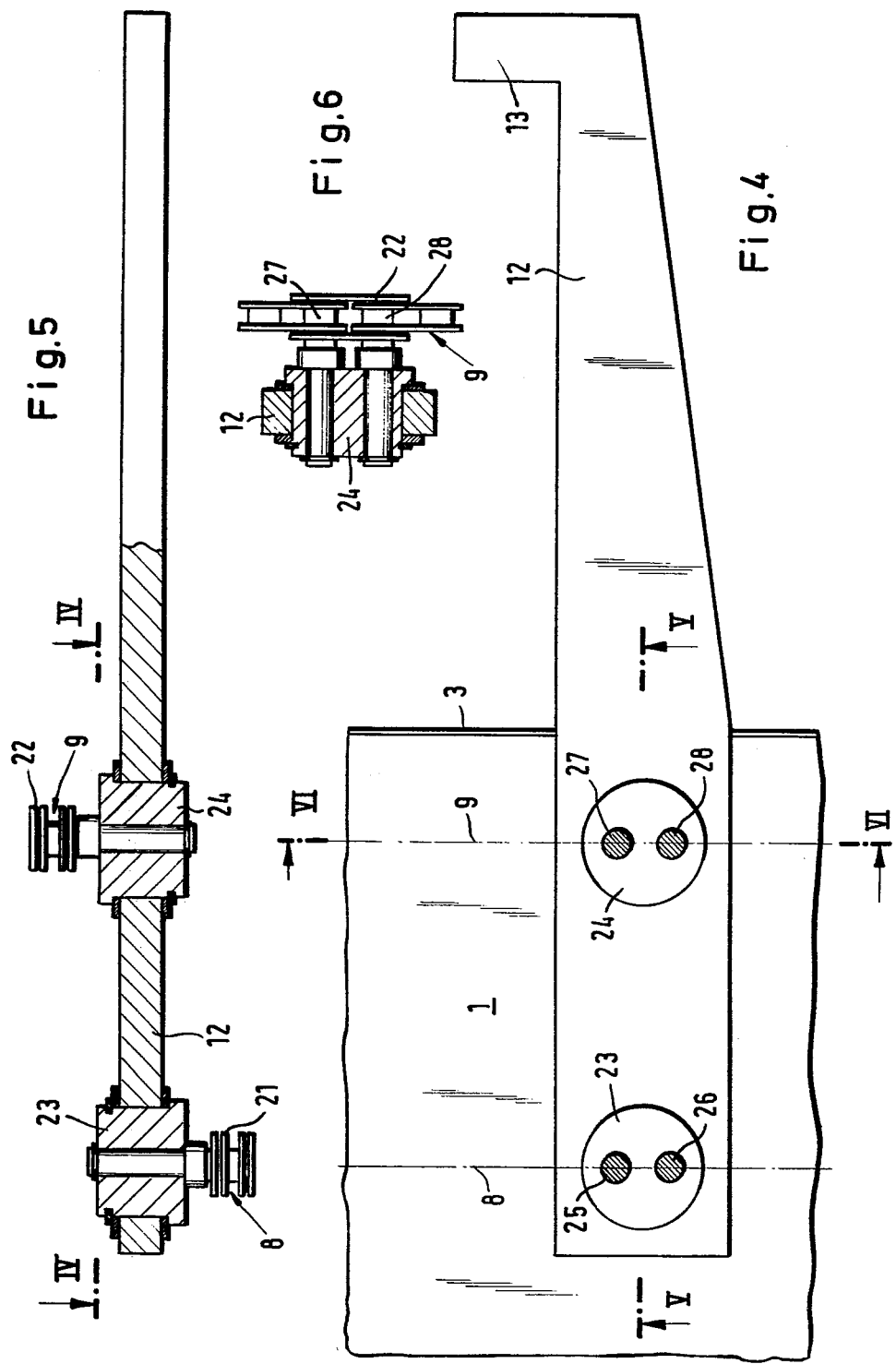

STACKING DEVICE FOR ROD-LIKE OR BOARD-SHAPED GOODS

BACKGROUND OF THE INVENTION

The present invention relates to a stacking device for rod-like or board-shaped goods, with stacking carts traveling vertically on upright stands. Horizontally traveling support arms and parallel-guided revolving engaging members having fixed stops are provided; these engaging members receive the goods at the rear side of the upright stand and deposit them on the storage area located on top of the upright stands.

Stacking devices of this type are known from German Pat. Nos. 1,191,296, 1,235,808, 2,445,536 and 2,553,724. By means of these known stacking devices, the goods are transported vertically upwards by an engaging member on the rear side of the upright stands and are deposited individually on the storage area on the top side of the stands and taken along by the next following engaging member by means of its fixed stop for further transport. The further transport of the goods takes place on the front side of the stands. Here the individual piece is conveyed downward till it is deposited on the extended support arms of the stacking cart and moved over individually to form a stack row. As soon as a stack row has reached the desired width, the support arms are retracted and the stacking carts are moved vertically by the height of one stack row whereupon the support arms are extended again to form the next stack row.

It was found that the working speed of these known stacking devices, particularly the speed of the engaging members around the stands, depends on the time required for changing layers, that is, on the time required for retracting the support arms, lifting the stacking carts and re-extending the support arms. Since, during this time interval, depositing of the goods on the support arms is not possible, the speed of the engaging members must be set so that no goods are deposited during this interval.

Another disadvantage of the known stacking devices is that the engaging members project from the stands on the front side also and may be jammed by falling pieces, causing breakage, particularly in the joints between the engaging members and the chains carrying them.

Another disadvantage is that the stands must be relatively tall so that the goods can be conveyed via magazines for spacer bars which might be directly attached to the stacking carts and are traveling vertically with them.

Accordingly, it is an object of the present invention to provide a stacking device of the above-mentioned type where the speed of the engaging members can be adjusted independently of the change of layers and hence can be increased in comparison with conventional stacking devices where the hazard of jamming the engaging members during the downward movement is avoided and where a lower construction height is possible.

Another object of the present invention is to provide a stacking arrangement, of the foregoing character, which is substantially simple in construction and may be economically fabricated.

A further object of the present invention is to provide an arrangement, as described, which may be readily maintained in service and which has a substantially long operating life.

SUMMARY OF THE INVENTION

The objects of the present invention are achieved by providing that the storage area extends at least by the width of a stack row to be formed beyond the stretch traversed by the fixed stop on the top side of the stands. Also, the stacking carts with retracted support arms, projecting beyond the top edge of the carts, for lifting the stack row underneath the storage area are vertically movable and lowerable with the stack row after extending the support arms, in order to deposit the stack row by retracting the support arms.

With the stacking device in accordance with the present invention, the speed of the engaging members is largely independent of the time required for a change of layers, since the stack row is formed at the same time as the layer is changed. The stack row is formed on the storage area, which has at least the width of one stack row, on the top side of the stands on which the individually conveyed pieces are conveyed one after the other by means of the fixed stops of the engaging members. Each fixed stop of each engaging member enters the interior volume of the stands at the same spot of the storage area so that the rear edge of each board to be deposited will be located at the same spot. Thus, each newly arrived board pushes the boards ahead of it by one board width forward along the storage area, to form the desired stack row.

The finished stack row, immediately after the last board of the stack row has been pushed over, is lifted by the retracted support arm of the vertically displaced stacking cart and removed from the storage area by extending the support arm and lowering the stacking cart; a new stack row can be formed immediately after lifting off the stack row. During the formation of the next following stack row, the preceding stack row is deposited on the desired stack so that there is no time lost for the change in layers.

Through the entry of the engaging members together with their fixed stops into the interior of the stands, for which reason the engaging members do not project beyond the formed surface of the stands, any danger of jamming the downward moving engaging members is avoided.

If stacking with spacer bars is desired, they can be placed directly on the stack row situated at the storage area with the spacer bar supply being located above the storage area. Thus the construction height of the individual stands can be reduced considerably so that manufacturing costs will be lower.

The fixed stops may be located on the forward end or in the middle part of the engaging members so that the board deposited by one engaging member is pushed into the desired stack row only by the next following engaging member. In another embodiment of the present invention, the fixed stops may also be located at the rear end of the engaging members. Thus every fixed stop pushes the board conveyed by the associated engaging member directly into the stack row.

The connection of the engaging members with two parallel chains was previously made with one bolt of a chain link for each of the two chains. This has led to ruptures from overload. The present invention provides that each engaging member is connected with one link each of the two parallel chains via swivels which are rotatable in the engaging member, but are laterally fixed and rigidly connected with both bolts of the chain link. This results in greater strength of the connection of the engaging members to the associated chains. When the chains pass over the sprocket wheels, the swivels are rotated inside the engaging members so that the top surfaces of the engaging members always remain in a substantially horizontal position.

To retract the support arms when depositing a stack row, a retaining or holding-back device is located on the stacking carts in accordance with the present invention. Furthermore, photocells are provided to control the stacking carts depending on the upper edge of the stack row deposited last, as well as counters for the number of pieces and layers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3a through 3f show a schematic illustration of the movement cycle of the stacking device;

FIG. 4 shows an enlargement of detail IV of FIG. 1 and a different embodiment;

FIG. 5 shows a section taken along line V—V in FIG. 4; and

FIG. 6 shows a section taken along line VI—VI in FIG. 4.

DESCRIPTION OF THE PREFERRED EMBODIMENTS

Figure 1:
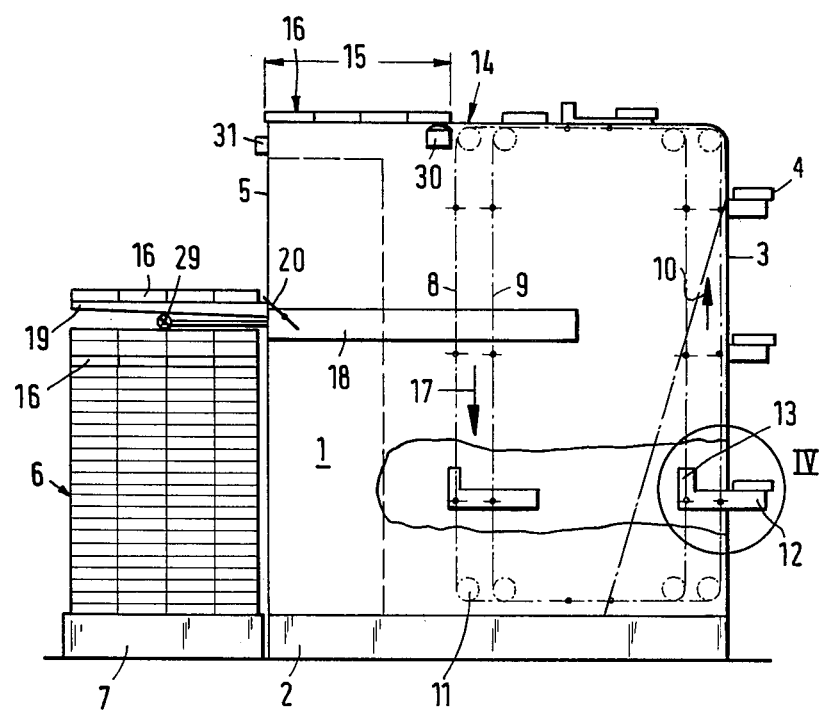
FIG. 1 shows a side view of an upright stand with a stack in front of it.

A stacking device for rod-like and board-shaped material ordinarily includes two upright stands 1 which are arranged a distance apart on a frame 2. The stacking device has the purpose of properly stacking boards 4 (or other rod-like or board-shaped pieces) arriving on the rear side 3 from delivery devices (not shown) on the front side 5 in a stack 6 on a pallet 7. For this purpose, the upright stand 1 has in its interior two revolving chains 8, 9 which are displaced in the longitudinal direction of upright stand 1 and are arranged parallel to each other in the transverse direction, shown in FIGS. 1 and 2. Chains 8, 9 are driven via drives (not shown) in the direction of arrow 10 and run around the sprocket wheels 11 located at the corners. Between the parallel chains 8, 9 there are engaging members 12 with fixed stops 13 arranged in a manner described below which revolve together with the chains 8, 9 in the direction of arrow 10.

Every engaging member 12 conveys a board 4 at the rear side 3 of the upright stand 1 upwards to the top side of stand 1; this top side forms storage area 14. The storage area 14 extends at least by the width 15 of a stack row 16 beyond the stretch traversed by the fixed stop 13 of each engaging member 12 on the top side of upright stand 1; it may have a suitable slide bar. The stretch traversed by the fixed stop 13 on the top side of stand 1 is precisely limited by the start of the downward movement of the engaging members along chains 8, 9 according to arrow 17. If fixed stops 13 are made adjustable (in a manner not shown) on the engagement pieces 12, the instant of arrival of the fixed stops 13 at the surface of the storage surface 14 can be varied.

In the embodiment shown, boards 4 are conveyed by means of engaging members 12 to the storage area 14, are deposited there, and pushed by the fixed stop 13 of the following engaging member 12 to the desired stack row 16.

Figure 2:
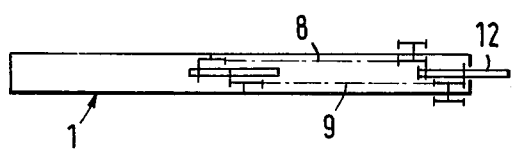
FIG. 2 shows a schematic of the chain circular conveyor for the engaging members in a top view of an upright stand.

As shown in FIG. 1, upright stand 1 has a width which approximately equals 1.5 times the width of chain drive 8, 9. If required, the rear side 3 of upright stands 1 can be chamfered in accordance with the broken line so that the engaging members 12 are guided along the chamfered rear side 3. Similarly, the front sides 5 may be displaced inward underneath the storage area 14.

As soon as a stack row 16 has been deposited on the storage area 14 of upright stands 1, the stacking carts 18, guided along side guides of stands 1, are moved vertically by drives (not shown) with support arms 19. These project beyond the top edge of the stacking carts 18 for lifting the stack row 16 underneath the storage area 14 and lowered with the stack row 16, after extending the support arms 19, onto the stack 6 in order to deposit the stack row 16 by retracting the support arms 19. Then the support arms 19 again travel in the vertical direction to receive the new stack row formed in the meantime.

The stacking carts 13 may have retaining devices 20 for the stack row 14 which is located on the support arms 19 and is to be deposited. The retaining device 20 may have the form of a pawl, a simple locking lever, etc. The front side 5 of stands 1 can also serve as retainer.

FIG. 3 shows a stacking cycle. FIG. 3a shows a stack row just being formed while the stacking cart 18 has deposited the previous stack row. FIG. 3b shows the new stack row finished, the stacking cart 18 having traveled vertically upward. In FIG. 3c the new stack row is just being lifted. FIG. 3d shows the stack row 14 extended on the support arm 19; in FIG. 3e it is lowered and deposited; while in FIG. 3f the next following stack row is formed.

FIG. 5 shows a preferred embodiment of a connection between the engaging members 12 and the associated chains 8, 9. The engaging member 12 is connected to a link 21, 22 of two parallel chains 8, 9 via a swivel 23, 24 which is rotatable in the engaging member and is fixed by lock rings and rigidly connected to both bolts 25, 26 or 27, 28 of the associated chain link 21 or 22. This design achieves a reliable flexible connection between chain 8, 9 and engaging member 12. When a chain link 21, 22 of a chain 8, 9 runs past a sprocket wheel, the swivel 23, 24 may turn in the engaging member without being displaced laterally. Hence the engaging members 12 remain in the desired horizontal position.

FIG. 4 shows an alternative embodiment of an engaging member 12 with a fixed stop 13 on the rear end.

The stacking cart 18 may mount photocells 29 or similar components which, together with an electronic control device (not shown) control the lowering of the stacking cart 18 as a function of the height of the upper edge of the previously deposited stack row 16. To count the number of pieces per stack row 16, electronic counters 30 may be installed. Similarly, layer counters 31 may be attached in the area of the stack rows 14 being lowered.

The stack row 16 formed on the storage area 14, in an alternative mode of operation of the stacking device, can also be pushed onto the support arm 19 which has already been extended. Also, a stacking cart 18 with support arm 19 can be located on both sides of each upright stand; these stacking carts alternately convey a stack row 16 downward.

The storage area 14 may be formed (in a manner not shown) by a rigid overhang beam on which the stack row 16 is pre-formed and from which the stack row 16 is lifted by means of the vertically traveling stacking cart(s) 18 with support arms 19.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A stacking device for rod- or board-shaped products, comprising: stacking carts; upright stands with a rear side; said stacking carts traveling vertically on said upright stands and having horizontally traveling support arms mounted thereon parallel-guided engaging members; storage area means; said engaging members having fixed stop means and receiving said products at the rear side of said upright stands below the level of the storage area, then elevating them to said level and pushing said products onto said storage area, said storage area being located on top of said upright stands and extending by the width of a stacked row beyond a distance traversed by said fixed stop means on top side of said upright stands; said stacking carts, with said support arms retracted and projecting over an upper edge of said stacking carts, being vertically movable underneath said storage area means for lifting a stacked row of said products; the support arms are then extended and said stacking carts are lowerable with said stacked row so that said stacked row may be deposited on a stack by retraction of said support arms.

2. A stacking device as defined in claim 1 wherein said fixed stop means are located at the rear end of said engaging members.

3. A stacking device as defined in claim 1 including swivel means, two parallel chains with chain links, each of said engaging members being connected with one of said links by said swivel means, said swivel means being rotatable in said engaging members; and means for laterally fixing said swivel means.

4. A stacking device as defined in claim 1 including retaining means mounted on said stacking carts for holding back said stacked row to be deposited which is located on said support arms.

5. A stacking device as defined in claim 1 wherein at least one of said stacking carts has a sensor element for controlling the lowering of said stacking carts by scanning the upper edge of the stacked row deposited last.

6. A stacking device as defined in claim 1 including quantity counter means located in the region of said storage, area means of at least one of upright stands.

7. A stacking device as defined in claim 1 wherein at least one of said upright stands has a layer counter directly in the region of movement of the stacked rows transported by said stacking carts.

* * * * *